United States Patent Office 3,194,689
Patented July 13, 1965

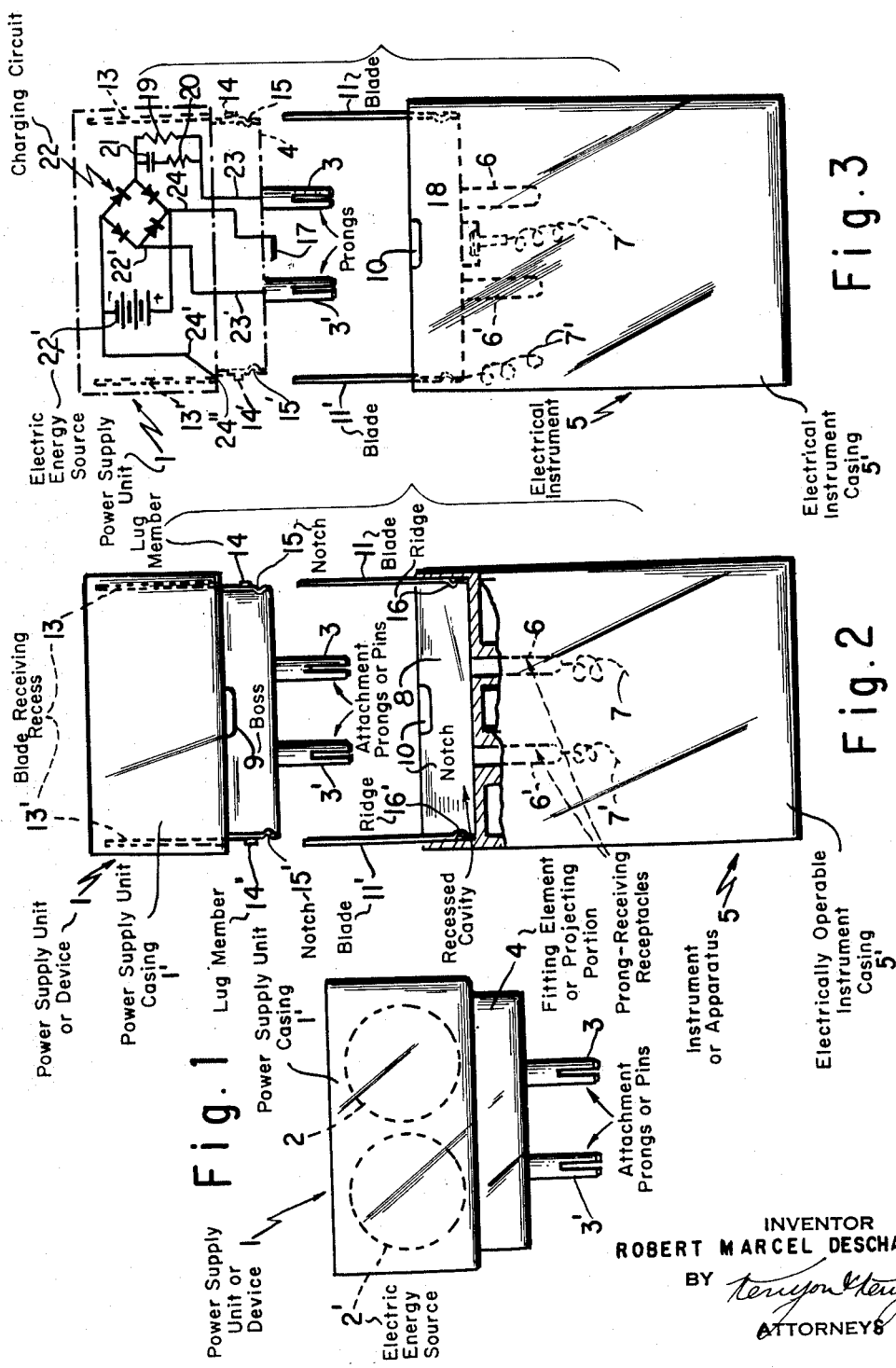

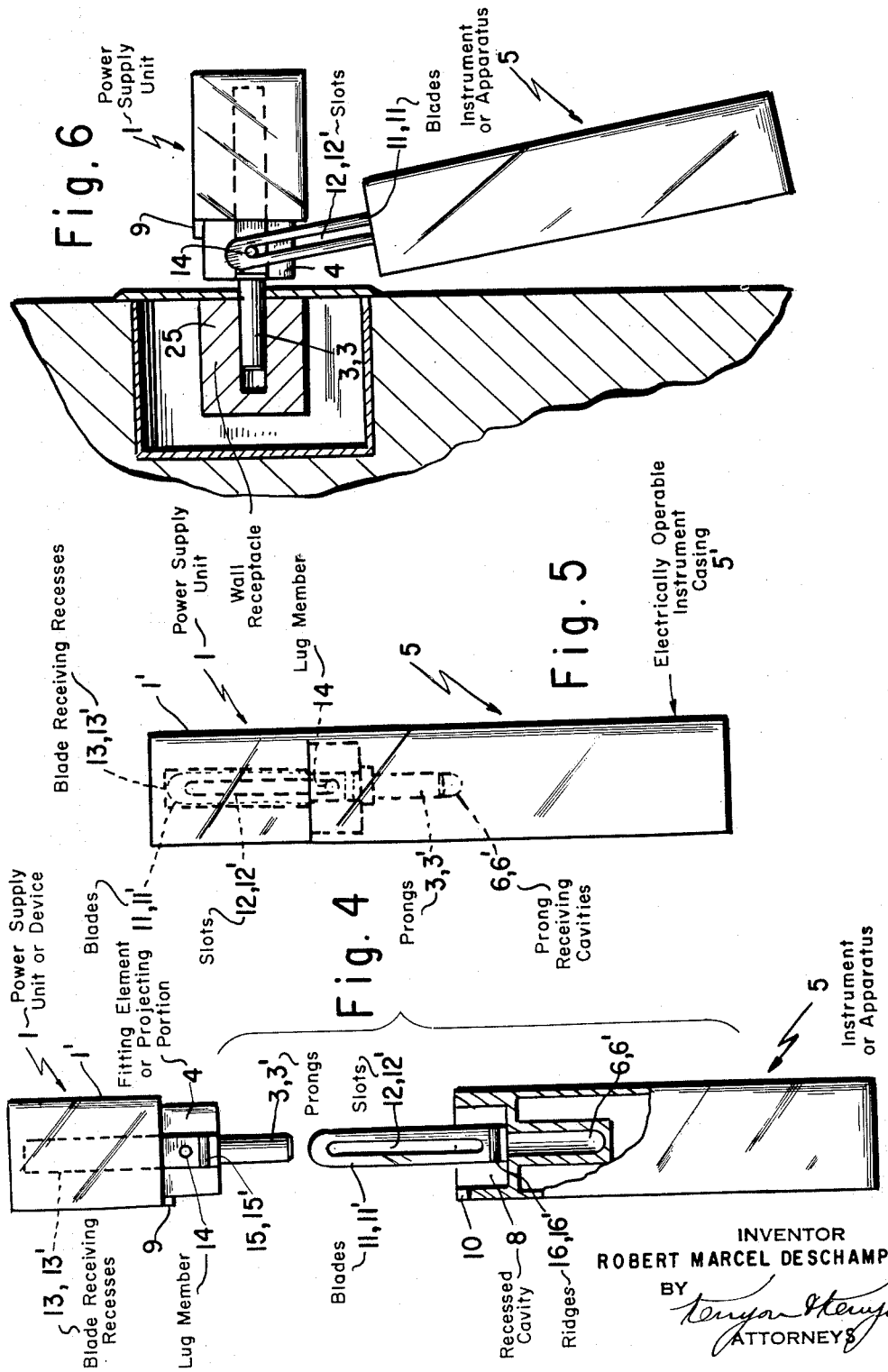

3,194,689
ELECTRICAL DEVICE CONSTITUTING A POWER SOURCE
Robert Marcel Deschamps, Paris, France, assignor to Societe des Accumulateurs Fixes et de Traction (Société Anonyme), Romainville, France, a company of France
Filed July 13, 1962, Ser. No. 219,609
Claims priority, application France, Mar. 16, 1962, 891,384
6 Claims. (Cl. 136—173)

The present invention relates to an electrical device constituting a power source.

Electrical instruments of small dimensions provided with a power source constituted by a primary or secondary battery have been manufactured in increasing numbers in the last few years. Such is the case, for example, of small radio sets more particularly those provided with transistors which are generally supplied by secondary batteries, primary batteries or rechargeable primary batteries, and which have a total volume of less than 200–250 cubic centimeters and a weight of less than 200–250 grams. When a primary battery is used, it is necessary to replace it when it is used up and, as a consequence, to take parts of the apparatus apart, thus baring the electrical connections. When a secondary battery is used, its recharging as well as the taking apart of the device must be considered. It is disadvantageous to do this because of possible damage to delicate electrical components and connections.

One purpose of the present invention is to simplify in a very large measure the power supply of such instruments and to realize a distinct separation between the power supply and the instrument to be supplied by it, thus preventing the disadvantages of occurrences pertaining to the electro-chemical cells from being a cause of damage to the supplied instrument as, for example, pocket radio sets, portable TV sets, hearing aids and for any other electrical gadget. The solution presented by this invention consists in creating an electrical device constituting a power source, more especially notable in that it is embodied as a separate unit containing either a primary battery, or a secondary battery, or a rechargeable primary battery and presenting coupling pins or prongs which may have to be used electrically, said unit being such that it can be directly adapted to and fastened to the body of any electrical apparatus or instrument such as a miniature radio set, more particularly of the transistor type, a portable TV set, a hearing aid or other electrical gadget.

According to another characteristic of the invention, the fastening of the said unit to the electrical apparatus which it must supply, is more especially realized by the use of the said coupling pins.

According to another characteristic of the invention elements intended for fitting in an outer casing of the supplied apparatus, are provided on the unit and cooperate with the said pins in its fastening.

According to another characteristic of the invention, the unit is completely closed externally, preferably in a gas-tight way.

It is thus seen that due to the provision of a power source having the form of a separate unit independent of the apparatus for which it is intended, the user is not required to take apart the general casing of the apparatus and thus it is not subject to the risk of eventually damaging its delicate connections.

The advantage resulting from the use of a device according to the invention is still greater when the separate unit is provided with a secondary battery. In this event, the unit may comprise a charging circuit of any type connected to the above-mentioned pins and may be provided with special connections ensuring the supply of the current to the apparatus when coupled thereto. This constitutes another important characteristic of the invention.

According to one embodiment of the said supply unit, connectors are provided on the fitting elements, which are located on another part of the outer surface of the unit or at any other suitable place thereof.

It is, of course, possible to provide binding means, operating either permanently or intermittently, between the separate power unit and the supplied instrument or apparatus. Such means may be constituted, still according to the invention, by a sliding articulation, more especially obtained by the use of sliding blades equipped with slots cooperating with lugs or the like.

It is then seen that any requirement for taking apart the casing of the apparatus for recharging the storage battery of the supply unit is completely eliminated and is replaced by a simple separation of the unit fastened to an outer part of the said apparatus. The said unit is then either replaced, or replaced in its position after charging of the battery with the current from available means. It is particularly advantageous to have an articulation between the supplied apparatus and the separate power unit, so that the said unit either may be maintained in mechanical connection with the supplied apparatus or may be separated from it and replaced.

Other objects of the invention, as new industrial products are apparatuses such as radio and TV sets, either portable or not, lamps, hearing aids and other electrical gadgets adapted for power supply by one or several of the above-mentioned power devices forming separate units, said devices being able to be bound either temporarily or permanently to such apparatus.

According to a characteristic of the invention the same power device may be used to supply several apparatuses by being adapted to any of them.

According to another characteristic of the invention the same apparatus may be supplied by any of several power devices, one of them being in use while the other ones are being charged, or kept for further use.

Other characteristics of the invention will become apparent from the following description and the accompanying drawings which are provided only as examples, and wherein:

FIGURE 1 is a front view of a separate power unit according to the invention;

FIGURE 2 is a front view, partly in section of a similar unit in position for use with a transistor type radio set;

FIGURE 3 is similar to FIGURE 2, but includes a diagrammatic view of the electrical connections in the power unit for the radio set;

FIGURE 4 is a side view of the components of FIGURES 2 and 3;

FIGURE 5 is a side view of the unit assembled and fitted on the radio set of the previous figures; and FIGURE 6 shows the power supply unit in relation to the radio set while being recharged.

According to the embodiment shown in FIGURE 1, the power device 1 according to the invention is seen as a unit having a casing 1' containing either primary or secondary batteries 2, 2' etc. It may be made as a completely closed and gastight element, and it comprises in the lower part two prongs or coupling pins 3, 3'. If the batteries 2 and 2' are not rechargeable these pins 3, 3' are advantageously used as output terminals. If the batteries 2, 2' are rechargeable, these pins 3, 3' are advantageously used as input terminals for the charging of the battery. They are also used then for mounting the unit in its proper place on the apparatus which it is to supply.

A projection 4 may also be provided on the outer casing 1' of the unit 1 and used for fitting into an appropriate recess on the outer surface of a radio set or other electrical apparatus. Thus, the fastening of the unit on the supplied apparatus 5 is made through the cooperation of pins or prongs 3, 3' and of the fitting element 4. The said supplied apparatus 5 has a casing 5'.

As has been mentioned above, the unit 1 may be manufactured independently of the apparatus 5 on which it is intended to be fitted and may be sold as such. It is obvious that its dimensions may vary according to the dimensions of the apparatus on which it is intended to be fitted. Preferably and still according to the invention, the said unit 1 will have an outer contour to mate with the contour of said apparatus with which it is to be used.

As has been explained hereabove, it is possible to bind the unit 1 to the supplied apparatus 5 by either detachable or permanent means which allow for a sliding and rotating motion. An embodiment of such binding means has been shown in FIGS. 2 to 4. According to this embodiment, the unit 1 is supposed to be adapted to a transistor radio set diagrammatically shown at 5. In the said set, two receptacles or housings 6, 6' are shown, which are intended to receive pins 3 and 3'. If the battery 2, 2' is of a non-rechargeable type, said housings are connected through leads 7, 7' (FIG. 2) to the electrical circuit (not shown) of the set 5. The upper part of the casing of the apparatus 5 has a recess or cavity 8 dimensioned complementally to receive the fitting projection 4 of the unit 1. Bosses 9 may also be provided on the periphery of unit 1, such bosses being dissymmetrically placed. Corresponding notches 10 are provided on the periphery of the cavity 8, the bosses and notches being intended to fit together to cooperate in mounting unit 1 on apparatus 5 and to ensure connection of proper polarities of the power supply from the unit 1 to the apparatus 5. Other known means for ensuring proper polarity may be used.

If the unit 1 is to be bound to the apparatus 5 by sliding and articulated means, metal connecting blades 11, 11' may be used, for instance, said blades extending from casing 5, and being provided with slots 12, 12' (see FIG. 4). In this event unit 1 is provided with corresponding housings 13, 13' which are intended to receive said blades 11, 11' when the unit is mounted on the apparatus. Lugs 14, 14' which are preferably metallic, are provided on the projection 4 of unit 1 and are housed in the slots 12, 12'. The locking of unit 1 on apparatus 5 may be completed if desired, by providing notches 15, 15' on the projection 4 and ribs 16, 16' on the inner surface of cavity 8. Thus, when unit 1 is assembled with the apparatus 5, the ribs 16, 16', and bosses 15, 15' are inter-engaged.

Blades 11, 11' are made elastic enough so that they can be disengaged from their cooperation with lugs 14, 14', thus making unit 1 completely independent of and separable from the apparatus 5. Normally, unit 1 can be lifted out of cavity 8 and housings 6, 6' and then rotated as shown in FIGURE 6.

This mode of assembling is more especially interesting if the unit contains rechargeable batteries. In this case, the unit contains not only the storage batteries diagrammatically represented as 2 and 2' on FIGURE 1, but also a suitable charging circuit diagrammatically shown in FIGURE 3.

If such a mode of assembly is used, pins or prongs 3 and 3' may be used for charging the storage batteries and one of the blades 11, 11' then may be used as output terminal of unit 1. Then, the second output terminal may comprise a special contact part 17 located on the unit and cooperating with a contact 18 of the supplied apparatus 5. It is understood that in such conditions the leads 7 and 7' of apparatus 5 are connected as shown in FIGURE 3, one to one of the blades 11, 11' and the other to the contact 18.

The charging circuit 22 of unit 1 may be of any already known type, such as the one shown in FIGURE 3. It may comprise, as usual, resistors 19 and 20, capacitor 21, a rectifier circuit 22', etc, To ensure the recharge of battery 2, 2' by means of pins or prongs 3 and 3', the latter are connected through leads 23, 23' to the input points of the rectifier 22' of the charging circuit 22 hereabove described, the output leads 24 and 24' from rectifier 22' being then connected, one to contact 17, the other to a contact 24'' provided on fitting projection 4, for electrical connection with the cooperating blade 11' of apparatus 5.

When the storage battery or batteries 2, 2' contained in the unit 1 are to be recharged, projection 4 must be disengaged from cavity 8 by lifting it out so that the slotted blades 11, 11' slide along the lugs 14, 14' and by then swinging the apparatus 5 on lugs 14, 14' as pivots so that it takes the position shown in FIGURE 6. Unit 1 has then rotated around lugs 14 and 14', used as pivots and prongs or pins 3, 3' are in a position to be pushed in a standard wall receptacle 25 of a conventional household supply means (not shown). Thus, extraneous power for charging the batteries 2, 2' may be connected to the latter via the prongs or pins 3, 3'.

After charging from these mains has been completed, the prongs or pins 3, 3' are withdrawn from receptacle 25 and the unit 1 is remounted on apparatus 5 to appear in assembly as shown in FIGURE 5.

The invention is, of course, in no way limited to the described and shown embodiments which have only been given as examples. Variations in detail within the scope of the appended claims are possible and are contemplated.

What is claimed is:

1. The combination of an electrically operable instrument having an instrument casing with a blade extending therefrom, a recessed cavity and prong-receiving receptacles; an electric power supply unit having a power supply unit casing with a blade-receiving recess, and a projecting portion, the projecting portion having attachment prongs extending therefrom, an electric energy source within said power supply unit casing; and means for effecting electrical connection between the electric energy source and the said instrument, whereby the projecting portion, attachment prongs and blade may engage the recessed cavity, receptacles and recess, respectively.

2. The combination recited in claim 1 wherein the electric energy source is rechargeable.

3. The combination recited in claim 1 wherein the blade has a ridge portion toward the end of the blade closest to the instrument casing, and the projecting portion of the power supply unit casing has a notch on its side surface which engages said ridge portion when the attachment prongs are within the prong-receiving receptacles, thereby locking the instrument and the unit together.

4. The combination recited in claim 1 wherein the blade has a slot extending along its longitudinal axis and the projecting portion of the power supply unit casing has a lug member extending therefrom slideably engaging the slot, whereby swiveling articulation of the said unit relative to the said instrument is obtained.

5. The combination recited in claim 1 wherein there are two blades extending from the instrument casing that are symmetrically arranged with respect to the longitudinal axis of the instrument casing, and the power supply unit casing has two blade-receiving recesses symmetrically arranged with respect to the longitudinal axis of the unit casing, and wherein each blade has a slot extending along its longitudinal axis and the projecting portion of the power supply unit casing has a pair of lug members extending from it, each of which slideably engage a slot, whereby swiveling articulation of the unit relative to the instrument is obtained.

6. The combination recited in claim 5 wherein the power supply unit contains an electric energy source and one of the two blades electrically connects the instrument directly to a terminal of said energy source in said unit.

References Cited by the Examiner
UNITED STATES PATENTS 2,963,573  12/60  Ziegenbein _____ 320—2
3,067,373  12/62  Hopt et al. _____ 320—2
3,109,132  10/63  Witte _____ 320—59

FOREIGN PATENTS 1,093,839  12/60  Germany.

WINSTON A. DOUGLAS, *Primary Examiner*.
JOHN H. MACK, *Examiner*.